(12) United States Patent
Takatani et al.

(10) Patent No.: US 7,760,490 B2
(45) Date of Patent: Jul. 20, 2010

(54) SOLID ELECTROLYTIC CAPACITOR AND METHOD OF MANUFACTURING SOLID ELECTROLYTIC CAPACITOR

(75) Inventors: Kazuhiro Takatani, Takatsuki (JP); Mutsumi Yano, Hirakata (JP); Takashi Umemoto, Hirakata (JP); Hiroshi Nonoue, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 183 days.

(21) Appl. No.: 11/949,880

(22) Filed: Dec. 4, 2007

(65) Prior Publication Data

US 2008/0259529 A1      Oct. 23, 2008

(30) Foreign Application Priority Data

Dec. 8, 2006    (JP) .............................. 2006-332366

(51) Int. Cl.
*H01G 9/04*     (2006.01)
*H01G 9/145*    (2006.01)

(52) U.S. Cl. ...................................... 361/532; 361/528

(58) Field of Classification Search ............... 361/523, 361/528, 532
See application file for complete search history.

(56) References Cited

U.S. PATENT DOCUMENTS

| | | | | |
|---|---|---|---|---|
| 6,430,033 | B1 * | 8/2002 | Mitsui et al. | 361/525 |
| 6,671,168 | B2 * | 12/2003 | Yoshida et al. | 361/523 |
| 7,218,506 | B2 * | 5/2007 | Kobayashi et al. | 361/523 |
| 7,411,779 | B2 * | 8/2008 | Merker et al. | 361/523 |

FOREIGN PATENT DOCUMENTS

| | | |
|---|---|---|
| JP | 04-048710 | 2/1992 |
| JP | 10-321471 | 12/1998 |

* cited by examiner

*Primary Examiner*—Eric Thomas
(74) *Attorney, Agent, or Firm*—Marvin A. Motsenbocker; Mots Law, PLLC (57) ABSTRACT

A solid electrolytic capacitor includes an anode substrate, a dielectric layer provided on the anode substrate, a first cathode layer provided on the dielectric layer, and a second cathode layer provided on the first cathode layer. The first cathode layer is a layer made of polyethylenedioxythiophene and polypyrrole. The second layer is a layer made of polypyrrole.

2 Claims, 4 Drawing Sheets

SOLID ELECTROLYTIC CAPACITOR AND METHOD OF MANUFACTURING SOLID ELECTROLYTIC CAPACITOR

CROSS REFERENCE TO RELATED APPLICATIONS

This application is based upon and claims the benefit of priority from prior Japanese Patent Application No. 2006-332366, filed on Dec. 8, 2006; the entire contents of which are incorporated herein by reference.

BACKGROUND OF THE INVENTION

1. Field of the Invention

The present invention relates to a solid electrolytic capacitor including a first cathode layer provided on a dielectric layer and a second cathode layer provided on the first cathode layer, and to a method of manufacturing the solid electrolytic capacitor.

2. Description of the Related Art

In recent years, as the performance of a CPU used in a PC or the like increases, a solid electrolytic capacitor having low equivalent series resistance (abbreviated as ESR) in a high frequency band has been required. The value of ESR depends on the conductivity of the cathode. In addition, in a case where the cathode includes a multilayer structure, the value of ESR depends on the contact resistance between the cathode layers.

As a solid electrolytic capacitor achieving a reduction in the value of ESR, a solid electrolytic capacitor including a first cathode layer provided on a dielectric layer and a second cathode layer provided on the first cathode layer is suggested (Japanese Patent Publication No. Heisei 4-48710, for example). The first cathode layer is a polypyrrole layer by chemical polymerization using a dopant containing aromatic sulfonic acid anion. The second cathode layer is a polypyrrole layer by electrolytic polymerization.

In addition, a solid electrolytic capacitor including a first cathode layer made of polythiophene or the like and a second cathode layer made of polypyrrole or the like is suggested (Japanese Patent Publication No. Heisei 10-821471, for example). Specifically, the first cathode layer is formed by heating or chemically polymerizing thiophene monomer.

SUMMARY OF THE INVENTION

A solid electrolytic capacitor according to a first aspect of the present invention includes an anode substrate; a dielectric layer provided on the anode substrate; a first cathode layer provided on the dielectric layer; and a second cathode layer provided on the first cathode layer. In the solid electrolytic capacitor, the first cathode layer is a layer made of polyethylenedioxythiophene and polypyrrole, and the second cathode layer is a layer made of polypyrrole.

In the aforementioned first aspect, the polyethylenedioxythiophene contained in the first cathode layer covers greater than 0% and smaller than 80% of the surface of the dielectric layer.

In the aforementioned first aspect, the polyethylenedioxythiophene contained in the first cathode layer covers greater than 2% and smaller than 35% of the surface of the dielectric layer.

A method of manufacturing a solid electrolytic capacitor according to a second aspect of the present invention includes the steps of: forming a dielectric layer on an anode substrate; forming a first cathode layer on the dielectric layer; and forming a second cathode layer on the first cathode layer. In the method, the step of forming the first cathode layer includes the steps of: performing a first oxidation process for attaching an oxidizing agent to a surface of the dielectric layer; allowing the vapor of ethylenedioxythiophene monomer to react with the oxidizing agent on the surface of the dielectric layer after the first oxidation process; and performing a first heating process for heating the ethylenedioxythiophene monomer allowed to react with the oxidizing agent on the surface of the dielectric layer.

The step of forming the first cathode layer according to the second aspect of the present invention may further include the steps of: performing a second oxidation process for attaching an oxidizing agent to the surface of the dielectric layer after the first heating process; and allowing the vapor of pyrrole monomer to react with the oxidizing agent on the surface of the dielectric layer after the second oxidation process.

In the case of the second aspect of the present invention, the heat applied in the first heating process may have a temperature range higher than 75° C. and lower than 180° C.

In the second aspect of the present invention, the oxidizing agent used in the first oxidation process preferably contains at least one substance selected from the group consisting of iron (III) p-toluenesulfonic acid, iron (II) dodecylbenzenesulfonic add, hydrogen peroxide, ammonium persulfate, sodium persulfate and sulfuric acid.

In the second aspect of the present invention, the oxidizing agent used in the second oxidation process preferably contains at least one substance selected from the group consisting of iron (III) p-toluenesulfonic acid, iron (II) dodecylbenzenesulfonic acid, hydrogen peroxide, ammonium persulfate, sodium persulfate and sulfuric acid.

DETAILED DESCRIPTION OF THE EMBODIMENTS

Hereinafter, a description will be given of a solid electrolytic capacitor according to an embodiment of the present invention with reference to drawings. It should be noted that same or similar reference numerals are given to denote same or similar portions in the drawings.

In addition, the drawings are merely schematically shown, and proportions of sizes and the like are different from actual ones. Accordingly, specific sizes and the like should be determined by referring to the description below. In addition, as a matter of course, a portion included in one of the drawings may be different in relationship or proportion of size from the corresponding ones in another one of the drawings.

First Embodiment

Configuration of Solid Electrolytic Capacitor

Figure 1:
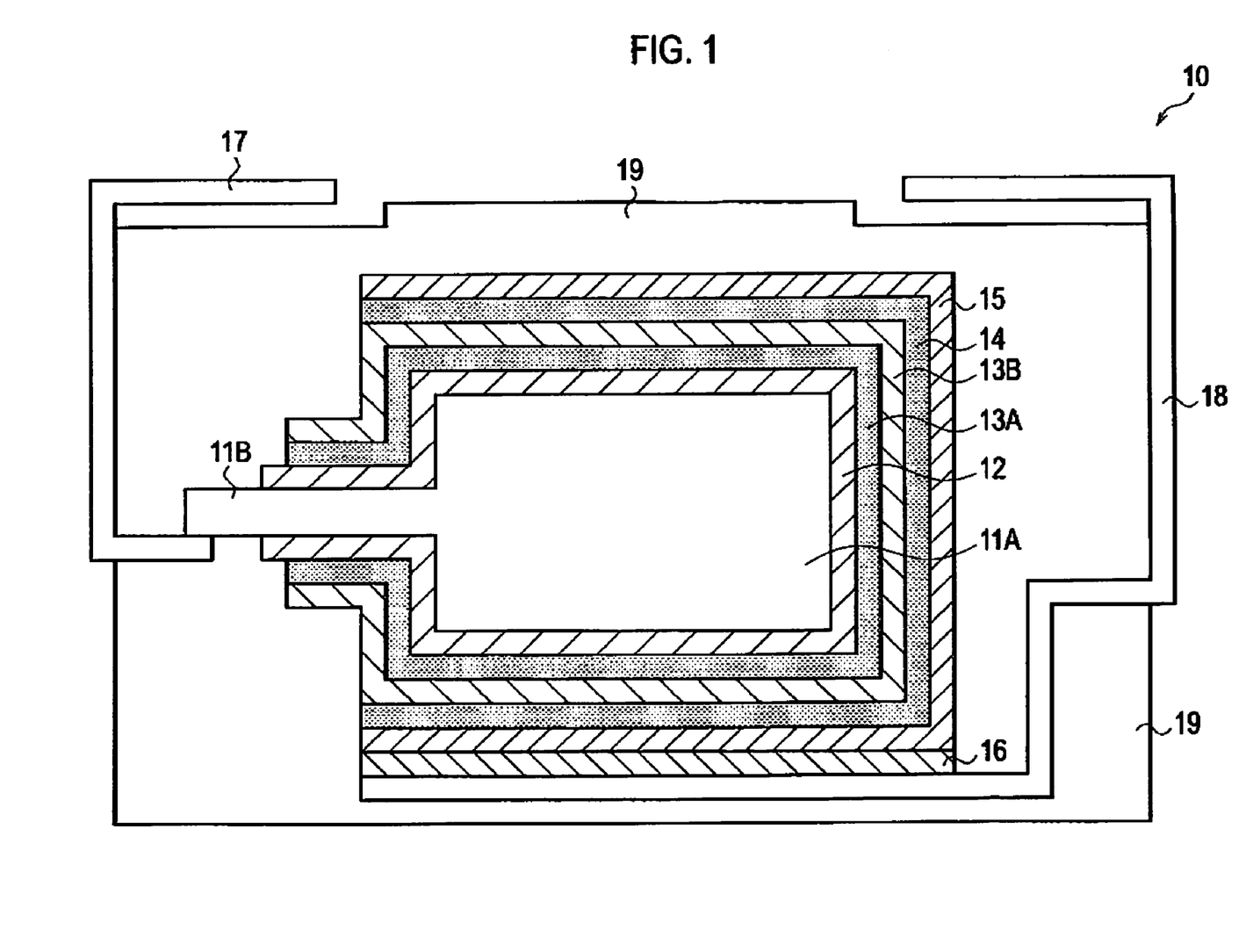
FIG. 1 is a diagram showing a configuration of a solid electrolytic capacitor 10 according to a first embodiment.

Hereinafter, a description will be given of a configuration of a solid electrolytic capacitor according to a first embodiment with reference to drawings. FIG. 1 is a diagram showing a configuration of a solid electrolytic capacitor 10 according to the first embodiment.

As shown in FIG. 1, the solid electrolytic capacitor 10 includes an anode body 11 configured of an anode substrate 11A and a lead wire 11B, a dielectric layer 12, a first cathode layer 13A, a second cathode layer 13B, a carbon layer 14, a silver layer 15, a conductive adhesive agent layer 16, an anode terminal 17, a cathode terminal 18 and a mold resin 19.

The anode substrate 11A is a porous sintered body made of a valve metal such as aluminum, tantalum, niobium or titanium. The lead wire 11B is made of a tantalum metal. The anode body 11 is formed by sintering tantalum metal powder having a predetermined average particle size (2 μm, for example) with the lead wire 11B embedded therein, for example.

The dielectric layer 12 is formed of an oxide film of the valve metal forming the anode substrate 11A. For example, the dielectric layer 12 is formed by anodizing the anode substrate 11A in an electrolyte aqueous solution (phosphoric acid aqueous solution, for example).

The first cathode layer 13A is a layer consisting of both polyethylenedioxythiophene (hereinafter, referred to as PEDOT) and polypyrrole (hereinafter, referred to as PPy). Here, at the interface between the first cathode layer 13A and the dielectric layer 12, the coverage of PEDOT on the dielectric layer 12 is preferably greater than 0% and smaller than 80%, and more preferably greater than 2% and smaller than 35%.

Figure 2:
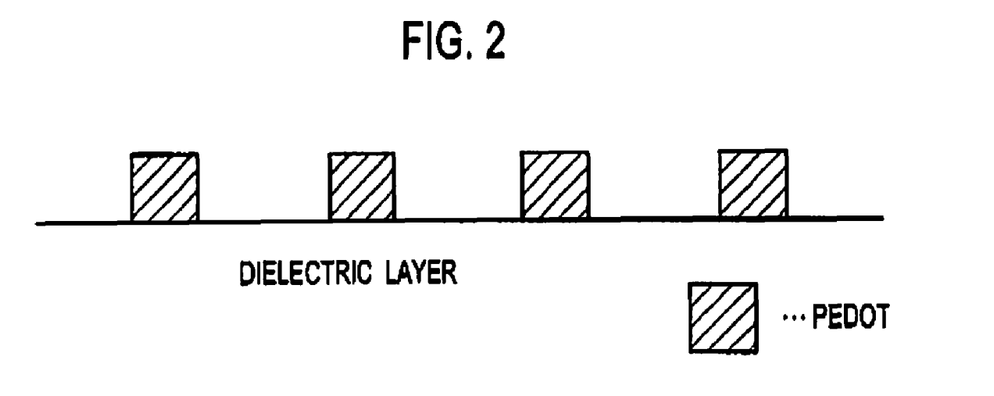
FIG. 2 is a diagram showing a state in which a dielectric layer 12 is partially coated by PEDOT in the first cathode layer 13A according to the first embodiment.

The first cathode layer 13A is formed by the following procedure. Specifically, a capacitor element formed of the anode substrate 11A and the dielectric layer 12 is soaked in an aqueous oxidizing agent solution (oxidation process (1)). Next, the vapor of ethylenedioxythiophene monomer (hereinafter, referred to as EDOT monomer) is allowed to react with the surface of the capacitor element (dielectric layer 12), and thereafter, a heating process is performed on the capacitor element. In this manner, the dielectric layer 12 is partially coated by PEDOT as shown in FIG. 2.

The oxidizing agent used in oxidation process (1) preferably contains at least one substance selected from the group consisting of iron (III) p-toluenesulfonic acid, iron (II) dodecylbenzenesulfonic acid, hydrogen peroxide, ammonium persulfate, sodium persulfate and sulfuric acid. It should be noted that these substances may be used in combination.

Figure 3:
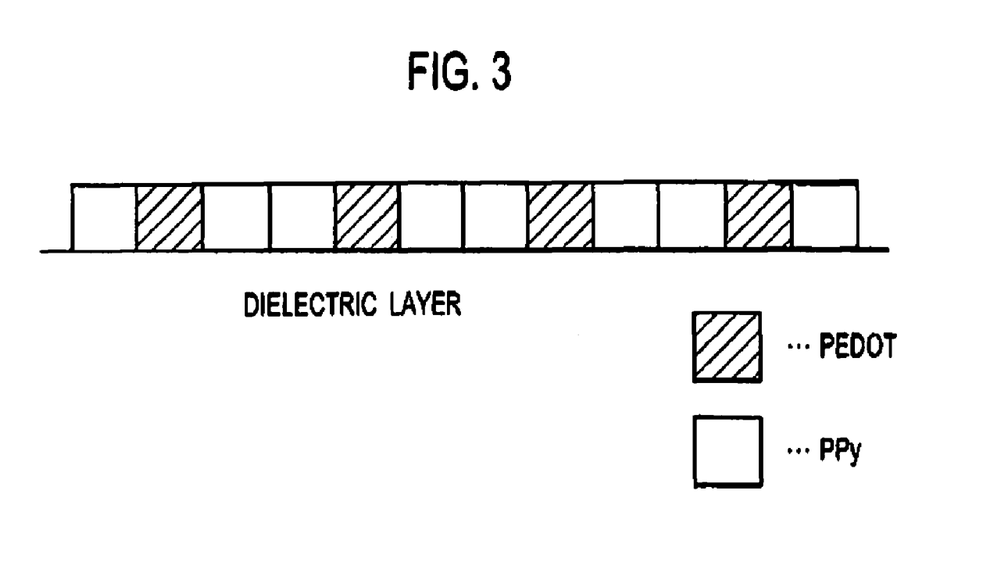
FIG. 3 is a diagram showing a state in which the dielectric layer 12 is coated by PEDOT and PPy in the first cathode layer 13A according to the first embodiment.

Subsequently, after the capacitor element is washed with water, the capacitor element is soaked in an aqueous oxidizing agent solution (oxidation process (2)). Next, the vapor of pyrrole monomer (hereinafter, referred to as Py monomer) is allowed to react with the surface of the capacitor element (dielectric layer 12). In this manner, the dielectric layer 12 is partially coated by PPy as shown in FIG. 3. Accordingly the first cathode layer 13A consisting of both PEDOT and PPy is formed.

The oxidizing agent used in oxidation process (2) preferably contains at least one substance selected from the group consisting of iron (III) p-toluenesulfonic acid, iron (II) dodecylbenzenesulfonic acid, hydrogen peroxide, ammonium persulfate, sodium persulfate and sulfuric acid. It should be noted that these substances may be used in combination.

In this manner, the first cathode layer 13A is formed by allowing the vapors of EDOT monomer and Py monomer to react with the surface of the dielectric layer 12 (chemical polymerization).

The second cathode layer 13B is a layer made of PPy. The second cathode layer 13B is formed by applying a current to the capacitor element including the first cathode layer 13A formed therein in a state in which the capacitor element is soaked in an aqueous solution containing pyrrole and sulfonic acid dopant, for example (electrolytic polymerization).

The carbon layer 14 is a layer made of carbon. The silver layer 15 is a layer made of silver. The carbon layer 14 is, for example, formed by coating carbon paste onto the capacitor element including the second cathode layer 13B formed therein. The silver layer 15 is, for example, formed by coating silver paste onto the capacitor element including the carbon layer 14 formed therein.

The conductive adhesive agent layer 16 is a layer obtained by curing a conductive adhesive agent. The anode terminal 17 is attached to the lead wire 11B of the anode body 11 by spot-welding or the like. The cathode terminal 18 is adhered to the silver layer 15 by the conductive adhesive agent coated onto the capacitor element including the silver layer 15 formed therein.

The mold resin 19 is an outer resin covering the capacitor element formed of the components from the anode body 11 to the cathode terminal 18. The mold resin 19 is, for example, made of an epoxy resin or the like.

Incidentally, as a matter of course, the anode terminal 17 and the cathode terminal 18 are withdrawn outside of the mold resin 19.

(Method of Manufacturing Solid Electrolytic Capacitor)

Figure 4:
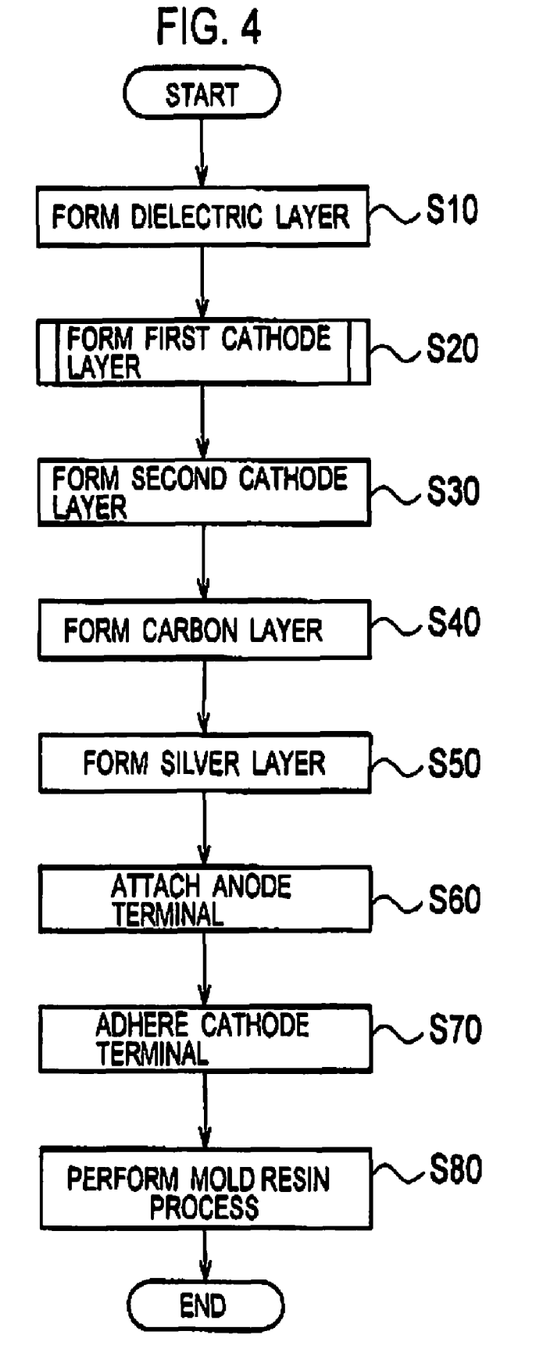
FIG. 4 is a flowchart showing a method of manufacturing the solid electrolytic capacitor 10 according to the first embodiment.

Hereinafter, a description will be given of a method of manufacturing the solid electrolytic capacitor according to the first embodiment with reference to drawings. FIG. 4 is a flowchart showing the method of manufacturing the solid electrolytic capacitor 10 according to the first embodiment.

As shown in FIG. 4, the dielectric layer 12 is formed in step 10 by anodizing the surface of the anode substrate 11A made of a valve metal. A constant voltage of 8 V is applied to the anode substrate 11A for 10 hours in a state in which the anode substrate 11A is soaked in a phosphorus solution (weight percent of phosphoric acid=0.1 wt %) retained at 60° C., for example. It should be noted that the anode substrate 11A is formed by sintering tantalum metal powder having an average particle size of 2 μm.

In step 20, the first cathode layer 13A consisting of both PEDOT and PPy is formed on the dielectric layer 12. The details of the forming of the first cathode layer 13A will be described later (refer to FIG. 5).

In step 30, the second cathode layer 13B made of PPy is formed on the first cathode layer 13A. A current of 0.5 mA is applied to the capacitor element including the first cathode layer 13A formed therein for five hours in a state in which the capacitor element is soaked in the aqueous solution containing pyrrole (3.2 mol/L and sulfonic acid dopant (0.2 mol/L), for example (electrolytic polymerization).

In step 40, the carbon layer 14 made of carbon is formed on the second cathode layer 13B. Carbon paste is coated onto the second cathode layer 13B, for example.

In step 50, the silver layer 15 made of silver is formed on the carbon layer 14. Silver paste is coated onto the carbon layer 14, for example.

In step 60, the anode terminal 17 is attached to the lead wire 11B by spot-welding.

In step 70, a conductive adhesive agent is applied to the silver layer 15, and the cathode terminal 18 is adhered to the silver layer 15 by the conductive adhesive agent.

In step 80, the capacitor element armed of the components from the anode body 11 to the cathode terminal 18 is covered by the mold resin 19. Transfer molding is performed by use of an epoxy resin under the conditions that the temperature is 160° C., the pressure is 150 kg/cm$^2$, and the period of time is 90 seconds, for example. Subsequently, the epoxy resin is cured by keeping, at 150° C. for four hours, the capacitor element including the mold resin 19 formed therein.

Here, the mold resin 19 is formed, so that the anode terminal 17 and the cathode terminal 18 are withdrawn outside the mold resin 19 as a matter of course.

Figure 5:
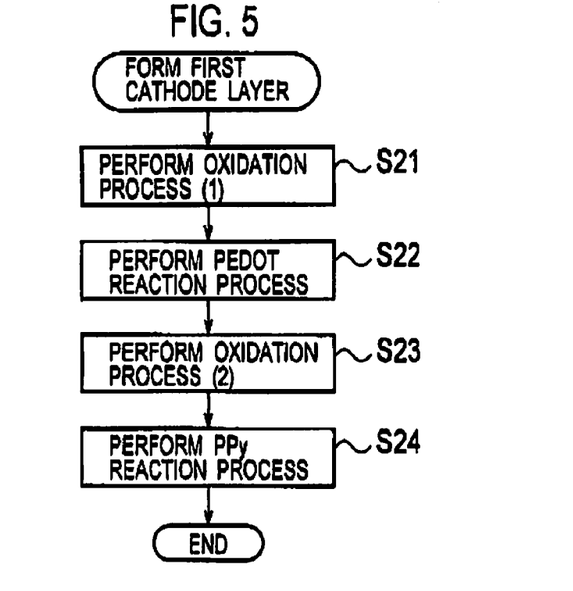
FIG. 5 is a flowchart showing a method of manufacturing the solid electrolytic capacitor 10 according to the first embodiment.

Next, a description will be given of the details of the forming of the first cathode layer 13A. FIG. 5 is a flowchart showing a method of forming the first cathode layer 13A according to the first embodiment.

As shown in FIG. 5, in step 21, the capacitor element configured of the anode substrate 11A and the dielectric layer 12 is subjected to oxidation process (1). The capacitor element is soaked in an aqueous oxidizing agent solution for five minutes, for example.

The oxidizing agent used in oxidation process (1) preferably contains at least one substance selected from the group consisting of iron (III) p-toluenesulfonic acid, iron (II) dodecylbenzenesulfonic acid, hydrogen peroxide, ammonium persulfate, sodium persulfate and sulfuric acid. It should be noted that these substances may be used in combination.

In step 22, after the vapor of EDOT monomer is allowed to react with the surface of the capacitor element (dielectric layer 12) that has been subjected to oxidation process (1), heating process (1) is performed on the capacitor element. Here, the period of time for which the vapor of EDOT monomer is allowed to react with is preferably not less than two minutes, but less than 25 minutes. In addition, heating process (1) is preferably performed in a temperature range higher than 75° C. and lower than 180° C.

In step 28, after the capacitor element that has been subjected to heating process (1) is washed with water, the capacitor element is subjected to oxidation process (2). The capacitor element is soaked in an aqueous oxidizing agent solution for five minutes, for example.

The oxidizing agent used in oxidation process (2) preferably contains at least one substance selected from the group consisting of iron (III) p-toluenesulfonic acid, iron (II) dodecylbenzenesulfonic acid, hydrogen peroxide, ammonium persulfate, sodium persulfate and sulfuric acid. It should be noted that these substances may be used in combination.

In step 24, the vapor of Py monomer is allowed to react with the surface of the capacitor element (dielectric layer 12) that has been subjected to oxidation process (2).

In this manner, the first cathode layer 13A is formed by allowing the vapors of EDOT monomer and Py monomer to react with the surface of the dielectric layer 12 (chemical polymerization).

(Effects and Advantages)

According to the solid electrolytic capacitor 10 according to the first embodiment, since the first cathode layer 13A contains PEDOT, the conductivity of the first cathode layer 13A improves. Furthermore, since the first cathode layer 13A contains PPy, and also the second cathode layer 13B is made of PPy, the contact resistance at the interface between the first cathode layer 13A and the second cathode layer 13B decreases. Thereby, a reduction in the ESR of the solid electrolytic capacitor 10 can be achieved.

In addition, a reduction in the ESR of the solid electrolytic capacitor 10 can be further achieved since, at the interface between the first cathode layer 13A and the dielectric layer 12, the coverage of PEDOT on the dielectric layer 12 is greater than 0% and smaller than 80% (preferably, greater than 2% and smaller than 35%), a further reduction in the ESR of the solid electrolytic capacitor 10 can be achieved According to the method of manufacturing the solid electrolytic capacitor in the case of the first embodiment, the step (step 20) of forming the first cathode layer 13A includes the step (step 22) of subjecting the capacitor element to heating process (1) after the vapor of EDOT monomer is allowed to react with the surface of the capacitor element (dielectric layer 12) (chemical polymerization). Accordingly, the first cathode layer 13A can be formed, so that the dielectric layer 12 is partially coated by PEDOT.

The step (step 20) of forming the first cathode layer 13A includes the step of allowing the vapor of Py monomer to react with the surface of the capacitor element (dielectric layer 12) (chemical polymerization). Accordingly, the first cathode layer 13A is formed so that PPy can coat the portions of the dielectric layer 12 that are not coated by PEDOT.

The solid electrolytic capacitor 10 having a further reduced ESR can be manufactured by adjusting the coverage of PEDOT on the dielectric layer 12. Here, the coverage can be controlled by an adjustment of the period of time for which the vapor of EDOT monomer is allowed to react with the surface of the capacitor element in the step of forming the first cathode layer 13A.

Moreover, since a heating process is performed for the capacitor element in a temperature range higher than 75° C. and lower than 180° C., the solid electrolytic capacitor 10 having a further reduced ESR can be manufactured.

In addition, the oxidizing agent used in heating process (1) and heating process (2) contains at least one substance selected from the group consisting of iron (III) p-toluenesulfonic acid, iron (II) dodecylbenzenesulfonic acid, hydrogen peroxide, ammonium persulfate, sodium persulfate and sulfuric acid. The solid electrolytic capacitor 10 having a further reduced ESR can be thus manufactured.

Although the present invention has been described by way of the above-mentioned embodiment, the descriptions and drawings that constitute a part of this disclosure should not be understood as to limit the scope of the present invention. For those who are skilled in the art, various alternative embodiments, examples, and operating techniques will be clear from this disclosure.

In the aforementioned embodiment, for example, the second cathode layer 13B is formed by electrolytic polymerization. The present invention is not limited to this, however. Specifically, the second cathode layer 13B may be formed by chemical polymerization.

EXAMPLES

Example 1

Hereinafter, descriptions will be given of results of comparison between the solid electrolytic capacitors according to Examples and the solid electrolytic capacitors according to Comparative Examples. It should be noted herein that Examples are different from Comparative Examples in configurations of cathode layers provided on a dielectric layer.

(Solid Electrolytic Capacitor According to Examples)

In the solid electrolytic capacitor according to Example 1, the cathode layer includes the first cathode layer consisting of both PEDOT and PPy (first cathode layer 13A), and the second cathode layer made of PPy (second cathode layer 13B).

Specifically, the first cathode layer of Example 1 was formed in the following manner. A capacitor element including a dielectric layer formed therein was soaked in an aqueous oxidizing agent solution containing iron (III) p-toluenesulfonic acid (weight percent of iron (III) p-toluenesulfonic acid=20 wt %) for five minutes. Subsequently, after the vapor of EDOT monomer was allowed to react with the surface of the capacitor element (dielectric layer) for 10 minutes, a heating process was performed on the capacitor element in a temperature range of 130° C. for 10 minutes.

Subsequently, after the capacitor element was washed with water, the capacitor element was soaked in the aqueous solution of an oxidizing agent containing iron (III) p-toluenesulfonic acid (weight percent of iron (III) p-toluenesulfonic acid=20 wt %) for five minutes. Subsequently, the vapor of Py monomer was reacted with the surface of the capacitor element (dielectric layer) for 10 minutes.

Moreover, the second cathode layer according to Example 1 was formed in the following manner. A current of 0.5 mA was applied to the capacitor element including the first cathode layer formed therein in a state in which the capacitor element was soaked in an aqueous solution containing pyrrole (3.2 mol/L) and sulfonic acid dopant (0.2 mol/L) (electrolytic polymerization).

Solid Electrolytic Capacitor According to Comparative Example 1

In the solid electrolytic capacitor according to Comparative Example 1, the cathode layer includes the first and second cathode layers both made of PPy. Specifically, the solid electrolytic capacitor according to Comparative Example 1 includes the first cathode layer made of only PPy instead of the first cathode layer consisting of both PEDOT and PPy. It should be noted that the first cathode layer was formed by chemical polymerization in Comparative Example 1.

Solid Electrolytic Capacitor According to Comparative Example 2

In the solid electrolytic capacitor according to Comparative Example 2, the cathode layer includes the first cathode layer made of PEDOT and the second cathode layer made of PPy. Specifically, the solid electrolytic capacitor according to Comparative Example 2 includes the first cathode layer made of only PEDOT instead of the first cathode layer consisting of both PEDOT and PPy. It should be noted that the first cathode layer was formed by chemical polymerization in Comparative Example 2.

Solid Electrolytic Capacitor According to Comparative Example 3

In the solid electrolytic capacitor according to Comparative Example 3, the cathode layer includes a layer made of only PPy. Specifically, the solid electrolytic capacitor according to Comparative Example 3 includes only the second cathode layer made of only PPy without forming the first cathode layer consisting of both PEDOT and PPy. It should be noted that the second cathode layer was formed by electrolytic polymerization in Comparative Example 3 as in the case of aforementioned Example 1.

Solid Electrolytic Capacitor According to Comparative Example 4

In the solid electrolytic capacitor according to Comparative Example 4, the cathode layer includes the first cathode layer made of PEDOT and the second cathode layer made of PPy. Specifically, the solid electrolytic capacitor according to Comparative Example 4 includes the first cathode layer made of only PEDOT instead of the first cathode layer consisting of both PEDOT and PPy.

It should be noted that in Comparative Example 4, after the capacitor element was soaked in a solution containing PEDOT (=5 wt %), p-toluenesulfonic acid (=25 wt %), n-butanol (=30 wt %), i-propanol (37 wt %) and pure water (=3 wt %), the capacitor element was polymerized at 50° C. for 10 minutes. Subsequently, after the capacitor element was washed with water, the capacitor element was dried at 100° C. for five minutes. In addition, the process consisting of soaking in the solution, the washing with water and drying was repeated five times. Thereby, the first cathode layer made of only PEDOT was uniformly formed on the surface of the dielectric layer.

(Measurements of ESR and Capacitance)

In each of aforementioned Example 1, Comparative Examples 1 to 4, ESR at 100 kHz and capacitance at 120 Hz were measured by use of an LCR meter.

(Measurements of Coverage of PEDOT)

Figure 6:
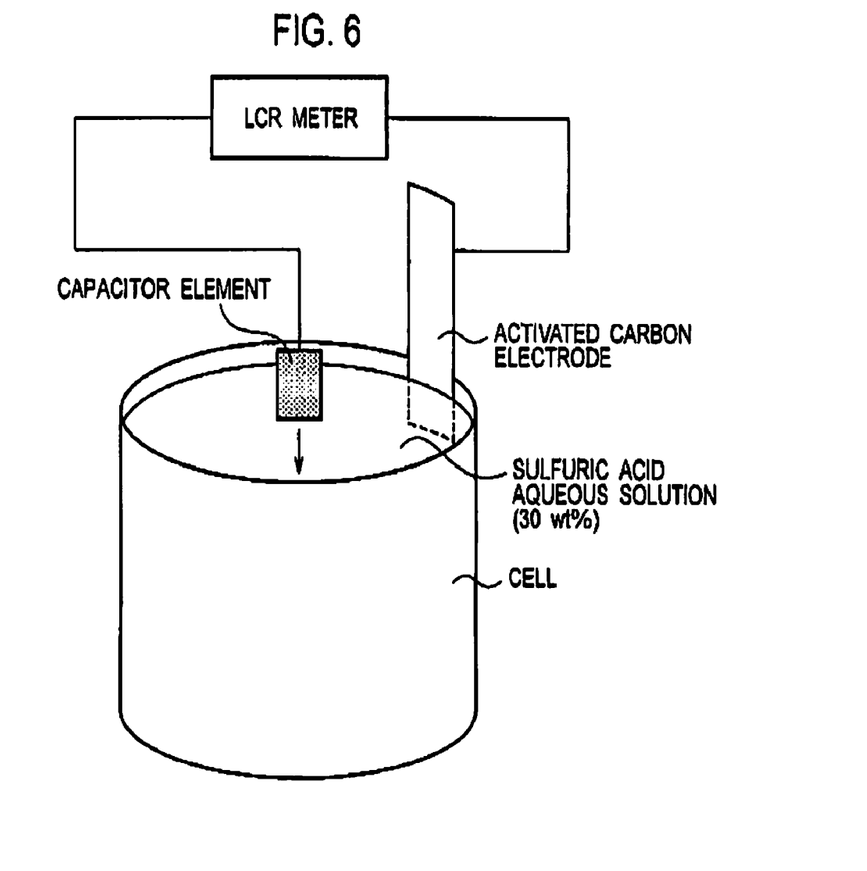
FIG. 6 is a diagram showing an apparatus for evaluating coverage of polyethylenedioxythiophene in the first cathode layer 13A according to the first embodiment.

In each of Example 1, Comparative Example 2 and Comparative Example 4, the value of coverage of PEDOT on the dielectric layer was measured by use of a measurement apparatus shown in FIG. 6. In each of the measurements of the coverage, the capacitor element including only the first cathode element without the second cathode layer being formed therein was used. In the measurement apparatus shown in FIG. 6, an activated carbon electrode is soaked in a sulfuric acid aqueous solution of 30 wt %.

Then, capacitance C1 at the frequency of 120 Hz was measured by use of the capacitor element and the activated carbon electrode as the counter electrode for the capacitor element. Here, the capacitor element was provided with only the dielectric layer on the anode substrate. Subsequently, in each of Example 1, Comparative Example 2 and Comparative Example 4, carbon paste and silver paste were coated onto the capacitor element including only the PEDOT layer formed therein. Then, capacitances C2, C3 and C4 each at the frequency of 120 Hz were measured. Moreover, by use of following formula (1), coverage of PEDOT was calculated.

$$\text{Coverage of PEDOT} = (C2(C3 \text{ or } C4)/C1) \times 100 \quad (1)$$

Table 1 is a table showing aforementioned measurement results.

TABLE 1

| Sample | First Cathode Layer | Second Cathode Layer | Coverage of PEDOT | ESR | Capacitance |
|---|---|---|---|---|---|
| Example 1 | PEDOT + PPy | PPy | 20% | 7 mΩ | 450 μF |
| Comparative Example 1 | PPy | PPy | — | 14 mΩ | 450 μF |
| Comparative Example 2 | PEDOT | PPy | 20% | 15 mΩ | 90 μF |
| Comparative Example 3 | — | PPy | — | 60 mΩ | 10 μF |
| Comparative Example 4 | PEDOT | PPy | 100% | 15 mΩ | 450 μF |

As shown in Table 1, in Example 1 where the capacitor element includes the first cathode layer consisting of both PEDOT and PPy and the second cathode layer made of PPy, it was confirmed that a reduction in ESR and an increase in capacitance are achieved in comparison with the capacitor elements in the cases of Comparative Examples 1 to 4.

On the other hand, in Comparative Example 1 where the capacitor element includes the first cathode layer made of only PPy, the ESR is supposedly not reduced since the conductivity of the first cathode layer is low.

In Comparative Example 2 where the capacitor element includes the first cathode layer made of only PEDOT, ESR is supposedly not reduced since the contact resistance at the interface between the first cathode layer and the second cathode layer is large. In addition, the capacitance is quite likely to be small since the coverage of PEDOT on the dielectric layer is small and the second cathode layer (conductive polymer layer) cannot be directly formed on the dielectric layer by electrolytic polymerization.

In Comparative Example 3 where the capacitor element does not include the first cathode layer, ESR is unlikely to be reduced and sufficient capacitance is also unlikely to be obtained since the second cathode layer (conductive polymer layer) cannot be directly formed on the dielectric layer by electrolytic polymerization.

In Comparative Example 4 where the capacitor element includes the first cathode layer made of only PEDOT uniformly formed on the dielectric layer, the ESR is supposedly not reduced since the contact resistance at the interface between the first cathode layer and the second cathode layer is large.

Example 2

Hereinafter, a description will be further given of the results of measurements of the solid electrolytic capacitors according to Examples. Specifically, the first cathode layers (Examples 2 to 12) each having a different coverage of PEDOT were formed by changing the period of time in which the vapor of EDOT monomer is allowed to react with the surface of the capacitor element in the aforementioned PEDOT reaction process (step 22). The periods of time in each of which the vapor of EDOT monomer is reacted with the surface of the capacitor element were 30 seconds, one minute, two minutes, three minutes, five minutes, 10 minutes, 15 minutes, 25 minutes, 40 minutes, 90 minutes and 120 minutes in Examples 2 to 12, respectively.

The values of coverage of PEDOT, ESR and capacitance in each Examples 2 to 12 were measured by use of the same technique as used in Example 1.

Table 2 is a table showing the results of these measurements. As shown in FIG. 2, the values of coverage of PEDOT were 1%, 2%, 8%, 5%, 10%, 20%, 30%, 35%, 40%, 70% and 80%, respectively in Examples 2 to 12.

TABLE 2

| Sample | Coverage of PEDOT | ESR | Capacitance |
| --- | --- | --- | --- |
| Example 2 | 1% | 11 mΩ | 450 µF |
| Example 3 | 2% | 11 mΩ | 450 µF |
| Example 4 | 3% | 9 mΩ | 450 µF |
| Example 5 | 5% | 9 mΩ | 450 µF |
| Example 6 | 10% | 8 mΩ | 450 µF |
| Example 7 | 20% | 7 mΩ | 450 µF |
| Example 8 | 30% | 8 mΩ | 450 µF |
| Example 9 | 35% | 11 mΩ | 450 µF |
| Example 10 | 40% | 11 mΩ | 450 µF |
| Example 11 | 70% | 11 mΩ | 450 µF |
| Example 12 | 80% | 12 mΩ | 450 µF |

As shown in Table 2, it was confirmed that the coverage of PEDOT on the dielectric layer at the interface between the first cathode layer and the dielectric layer is preferably greater than 0% and smaller than 80%, and more preferably greater than 2% and smaller than 35%.

Example 3

Hereinafter, a description will be further given of the results of measurements on the solid electrolytic capacitors according to Examples. Specifically, the different first cathode layers (Examples 13 to 20) were formed by changing the temperature conditions each used in heat treatment (1) to be performed after the vapor of EDOT monomer is allowed to react with the surface of the capacitor element in the aforementioned PEDOT reaction process (step 22). The temperatures used in heat treatment (1) of Examples 13 to 20 were 75° C., 80° C., 100° C., 130° C., 150° C., 170° C., 180° C. and 190° C., respectively.

The values of ESR and capacitance in each of Examples 13 to 20 were measured by use of the same technique as used in Example 1.

Table 3 is a table showing the results of these measurements.

TABLE 3

| Sample | Temperature in Heating Process | ESR | Capacitance |
| --- | --- | --- | --- |
| Example 13 | 75° C. | 11 mΩ | 450 µF |
| Example 14 | 80° C. | 8 mΩ | 450 µF |
| Example 15 | 100° C. | 7 mΩ | 450 µF |
| Example 16 | 130° C. | 7 mΩ | 450 µF |
| Example 17 | 150° C. | 7 mΩ | 450 µF |
| Example 18 | 170° C. | 8 mΩ | 450 µF |
| Example 19 | 180° C. | 11 mΩ | 450 µF |
| Example 20 | 190° C. | 11 mΩ | 450 µF |

As shown in Table 3, it was confirmed that the temperature used in heat treatment (1) is preferably higher than 75° C. and lower than 180° C.

Example 4

A description will be further given of the results of measurements on the solid electrolytic capacitors according to Examples. Specifically, the different first cathode layers (Examples 21 to 35) were formed by changing, in the aforementioned oxidation process (1) (step 21) and oxidation process (2) (step 23), a type of the oxidizing agent included in the aqueous oxidizing agent solution in which the capacitor element is soaked.

The values of ESR and capacitance in each of Examples 21 to 35 were measured by use of the same technique as used in Example 1.

Table 4 is a table showing the results of these measurements.

TABLE 4

| Sample | Oxidizing Agent (PEDOT) | Oxidizing Agent (PPy) | ESR | Capacitance |
|---|---|---|---|---|
| Example 21 | Iron (II) dodecylbenzenesulfonic acid | Iron (III) p-toluenesulfonic acid | 7 mΩ | 450 μF |
| Example 22 | Hydrogen peroxide | Iron (III) p-toluenesulfonic acid | 7 mΩ | 450 μF |
| Example 23 | Ammonium persulfate | Iron (III) p-toluenesulfonic acid | 7 mΩ | 450 μF |
| Example 24 | Sodium persulfate | Iron (III) p-toluenesulfonic acid | 7 mΩ | 450 μF |
| Example 25 | Sodium perborate | Iron (III) p-toluenesulfonic acid | 11 mΩ | 450 μF |
| Example 26 | Nitric acid | Iron (III) p-toluenesulfonic acid | 11 mΩ | 450 μF |
| Example 27 | Iron (III) p-toluenesulfonic acid | Iron (II) dodecylbenzenesulfonic acid | 7 mΩ | 450 μF |
| Example 28 | Iron (III) p-toluenesulfonic acid | Hydrogen Peroxide | 7 mΩ | 450 μF |
| Example 29 | Iron (III) p-toluenesulfonic acid | Ammonium persulfate | 7 mΩ | 450 μF |
| Example 30 | Iron (III) p-toluenesulfonic acid | Sodium persulfate | 7 mΩ | 450 μF |
| Example 31 | Iron (III) p-toluenesulfonic acid | Sodium perborate | 11 mΩ | 450 μF |
| Example 32 | Iron (III) p-toluenesulfonic acid | Nitric acid | 11 mΩ | 450 μF |
| Example 33 | Iron (III) p-toluenesulfonic acid | Iron (III) p-toluenesulfonic acid | 7 mΩ | 450 μF |
| Example 34 | Sulfuric acid | Iron (III) p-toluenesulfonic acid | 7 mΩ | 450 μF |
| Example 35 | Iron (III) p-toluenesulfonic acid | Sulfuric acid | 7 mΩ | 450 μF |

As shown in Table 4, it was confirmed that the oxidizing agent used in oxidation process (1) is preferably one substance selected from the group consisting of iron (III) p-toluenesulfonic acid, iron (II) dodecylbenzenesulfonic acid, hydrogen peroxide, ammonium persulfate, sodium persulfate and sulfuric acid. Similarly, it was confirmed that the oxidizing agent used in oxidation process (2) is preferably one substance selected from the group consisting of iron (III) p-toluenesulfonic acid, iron (II) dodecylbenzenesulfonic acid, hydrogen peroxide, ammonium persulfate, sodium persulfate and sulfuric acid.

What is claimed is:

1. A solid electrolytic capacitor comprising:
   an anode substrate;
   a dielectric layer provided on the anode substrate;
   a first cathode layer provided on the dielectric layer; and
   a second cathode layer provided on the first cathode layer, wherein
   the first cathode layer is a layer made of polyethylenedioxythiophene and polypyrrole, and
   the second cathode layer is a layer made of polypyrrole
   wherein the polyethylenedioxythiophene contained in the first cathode layer covers greater than 0% and smaller than 80% of the surface of the dielectric layer.

2. The solid electrolytic capacitor according to claim 1, wherein
   the polyethylenedioxythiophene contained in the first cathode layer covers greater than 2% and smaller than 35% of the surface of the dielectric layer.

* * * * *